Patented Sept. 17, 1940

2,215,429

UNITED STATES PATENT OFFICE 2,215,429

METAL COMPOUNDS OF ALIPHATIC POLYHYDROXY MONOCARBOXYLIC ACIDS AND PROCESS OF MAKING THEM

Hans Schmidt, Wuppertal-Vohwinkel, and Heinrich Jung, Wuppertal-Elberfeld, Germany, assignors to Winthrop Chemical Company, Inc., New York, N. Y., a corporation of New York No Drawing. Application March 4, 1937, Serial No. 128,988. In Germany May 30, 1931

13 Claims. (Cl. 260—435)

The present invention relates to water soluble metal complex compounds of aliphatic polyhydroxy monocarboxylic acids suitable for therapeutic use and to a process of preparing the same, said invention being a further development of the invention described and claimed in the copending U. S. application Ser. No. 500,434, filed December 5, 1930 which has matured into U. S. P. 2,066,742.

This patent generally describes complex compounds of metals with aliphatic polyhydroxy carboxylic acids, said complex compounds may contain alkali metal or nitrogen bases as neutralizing agents.

In accordance with the present invention complex compounds of particular therapeutic value hitherto not described are obtained, when in the production of neutral water-soluble complex compounds of aliphatic polyhydroxy monocarboxylic acids with base metals, the atomic number of which is at least 22, but which do not belong to the alkali or alkaline earth and earth metal series, basic compounds of calcium or strontium or equivalents thereof as hereinafter stated are used for neutralization of the said metal complex compounds. In this manner it becomes possible to combine compounds of the base metals of an atomic number of at least 22, with the exception of metals of the alkali or alkaline earth and earth metal series, with calcium or strontium to yield products, soluble in water with a neutral reaction; this result is an advance in the preparation of media, especially for therapy by injection. The new metal complex compounds, as compared with similar compounds already described, display in many cases the further advantage that they can be applied not only without causing irritation, but in contradistinction to the corresponding alkali metal or amine salts without involving pain as the result of subcutaneous injection.

The production of the new complex compounds is carried out by the customary methods. Thus, for example, the oxide, hydroxide or salt of a metal of the type above specified can be caused to react with the solution of an aliphatic polyhydroxy monocarboxylic acid or of a water-soluble salt of such an acid with the addition of a quantity of a basic compound of calcium or strontium required for the formation of the neutral calcium or strontium salt of the metal complex compound. In particular it is possible to employ the calcium or strontium salts of the aliphatic polyhydroxy monocarboxylic acids as starting materials. As basic compounds of calcium or strontium can be used, for example, the oxides, hydroxides or carbonates. The simultaneous use of a calcium or strontium salt and a basic compound of the alkali metals has been found to be equivalent to the direct use of the basic compounds of calcium or strontium above indicated.

Suitable polyhydroxy monocarboxylic acids capable of forming complex compounds are particularly the aliphatic hydroxy monocarboxylic acids of at least 5 carbon atoms and containing at least 3 hydroxy groups bound to 3 adjoining carbon atoms. We prefer to use the acids obtainable by the oxidation of sugars, for example, arabonic acid, the acid of the formula $$HOOC-C(CH_3)OH \cdot CHOH \cdot CHOH \cdot CH_2OH$$

gluconic acid, galactonic acid and lactobionic acid, but also polyhydroxy monocarboxylic acids obtainable by other methods, for example, glucoheptonic acid and mannoheptonic acid may be advantageously employed. The use of lactones of the polyhydroxy monocarboxylic acids is equivalent to the acids themselves, because it is known that these lactones are changed into their corresponding acids by the afore-mentioned neutralization. For this reason the term "polyhydroxy monocarboxylic acid" used in the appended claims is intended to include the lactones of these acids.

The metals can be combined with the complex-forming polyhydroxy monocarboxylic acids in different relative amounts, and it therefore appears that the reaction is not confined to stoichiometric proportions.

It is without importance in which sequence the different compounds are reacted upon.

In the examples mentioned below we have described the production of complex compounds with those metals which are of especially high interest for the medicinal use in this combination, that is to say, iron, tin, antimony, lead. Furthermore arsenic, copper, lanthanum are also to be mentioned. In the same manner as described in the examples water-soluble, neutral metal complex compounds of thallium, cobalt, manganese, titanium, vanadium, nickel and the like may be prepared, displaying a similar behavior as the products described in the examples and being characterized by the metal used in each individual case. In each case it is essential that the final reaction of the complex compound is made about neutral. From the aqueous reaction mixture the complex compounds formed may advantageously be separated by pouring the solution into an alcohol, preferably methyl alcohol, and washing the precipitate formed with an alcohol, for example, an about 80 to 100% methyl alcohol.

The composition of our new complex compounds may vary within wide limits and is not restricted to stoichiometric proportions. Moreover, particularly those compounds which do not correspond to simple atomic proportions, often display especially good therapeutic properties. In this connection it may be emphasized that the purpose of the present invention is not to provide metal complex compounds of a definite chemical composition which would be of a more scientific interest but to provide valuable medicinal media.

In view of the complicated composition of the new products proved by analysis we are not able to give structural formulae which would define the products of the present invention in a general and more easily visible manner. However, in order to indicate more clearly which types of compounds are presumably formed by the present process the following probable formula of one compound, that is the calcium ferric-III-gluconate $$[Fe_2\{OCH_2 \cdot (CHOH)_4 \cdot COO\}_6]Ca_3$$

may give some idea of our new products. In this case two atoms of trivalent iron are combined with hydroxyl groups of six molecules of gluconic acid, the carboxylic acid group of which have been neutralized by three calcium atoms. The reaction is most probably performed according to the following equation $$3Ca \cdot [CH_2 \cdot OH \cdot (CH \cdot OH)_4 \cdot COO]_2 + 2FeCl_3 + 3CaCO_3 = [Fe_2\{OCH_2 \cdot (CHOH)_4 \cdot COO\}_6 \cdot ]Ca_3 + 3CaCl_2 + 3CO_2 + 3H_2O$$

In many cases complex compounds of another composition have proved especially good properties, whereby the complex bound metal may be combined with the aliphatic polyhydroxy carboxylic acid in other proportions, the metal apparently being bound to the hydroxy groups of different molecules of the aliphatic polyhydroxy carboxylic acid in another proportion.

The metal is bound in the new complex compounds in complex-like linkage. This follows from the fact that these metals are not precipitated by dilute caustic alkali lyes or dilute hydrochloric acid. The complex-like linkage of the metal, the solubility of the complex compounds in water with about neutral reaction and the simultaneous content of the complexly bound metal and of calcium or strontium are the important characteristics of our new products.

The new compounds are white to colored powders, this depending on the metal used for the complex compounds. These compounds decompose on heating without distinctly melting and yield neutral aqueous solutions which are suitable for injection purposes in the medicinal practice.

The invention is further illustrated by the following examples but is not restricted thereto. The parts are by weight.

*Example 1*

8.6 parts of calcium gluconate, 2.7 parts of crystallized ferric chloride ($6H_2O$) and 40 ccs. of water are heated until solution has occurred. The solution is boiled together with 2 parts of calcium carbonate until the evolution of carbon dioxide has ceased. The solution is filtered and the filtrate poured into methylalcohol. A light yellow amorphous powder, readily soluble in water, is obtained in a good yield, possessing an iron content of about 8%. The composition of the calcium iron-gluconate corresponds approximately to the formula:

$$(Fe_2(OCH_2.(CHOH)_4.COO)_6)Ca_3$$

The aqueous solution is not precipitated by means of dilute caustic soda; oxalic acid precipitates calcium oxalate.

In the above described process calcium carbonate can be replaced by calcium hydroxide as neutralizing agent.

*Example 2*

9.52 parts of anhydrous strontium gluconate, 2.7 parts of crystallized ferric chloride ($6H_2O$) and 40 ccs. of water are heated until solution has occurred and the solution is boiled with 3 parts of strontium carbonate until evolution of carbon dioxide has ceased. The solution is filtered and the filtrate poured into methylalcohol. A light yellow amorphous powder, readily soluble in water, is obtained in a good yield having an iron content of about 7.3%. The composition of the strontium iron gluconate presumably corresponds to the formula:

$$Fe_2(OCH_2.(CHOH)_4.COO)_6 Sr_3$$

*Example 3*

A solution of 8.6 parts of calcium gluconate and 4 parts of ferrous chloride ($4H_2O$) in about 40 ccs. of water is neutralized with milk of lime and the filtrate is poured into methylalcohol. After separation and drying a green amorphous powder is obtained, which is readily soluble in water.

*Example 4*

A solution of 10 parts of calcium gluconate in about 60 ccs. of water is boiled with 5 parts of arsenious acid until almost the whole is dissolved. The filtrate is poured into methylalcohol.

After separation and drying a white non-hygroscopic powder is obtained in a good yield, which is readily soluble in water in contradistinction to the calcium gluconate used. The arsenic content of the calcium arsenic-gluconate amounts to about 20%. Likewise calcium gluconate of vanadium can be prepared by treating vanadium tetroxide with calcium hydroxide.

*Example 5*

8.6 gs. of calcium gluconate are added to a solution of 2 gs. of lanthanum carbonate in 20 ccs. of N-hydrochloric acid and 25 ccs. of water after the evolution of carbon dioxide has ceased, then heated until solution has occurred and boiled with 2 gs. of calcium carbonate and filtered. The clear solution is poured into methylalcohol, while stirring, the precipitate formed is filtered by suction, washed with methylalcohol and ether and dried. The calcium lanthanum-gluconate forms a white powder, readily soluble in water, of a lanthanum content of about 10%.

*Example 6*

60 gs. of calcium gluconate are suspended in 250 ccs. of water. The suspension is heated and a solution of 11.5 gs. of antimony trichloride in a little methylalcohol is added. Then 2 N-milk of lime is added until a neutral reaction has been attained, the solution is filtered and the still hot filtrate is poured into methylalcohol, while stirring; the complex salt formed is filtered by suction, the mother liquor containing sodium chloride is advantageously washed out with 80% methylalcohol and the salt is dried in air. The calcium antimony-gluconate is obtained as a colorless powder, soluble in water with a neutral reaction, of an antimony content of about 11.5%. The aqueous solution remains clear on the addition of dilute hydrochloric acid or dilute caustic soda. Oxalic acid precipitates calcium oxalate, sulfuretted hydrogen precipitates antimony sulfide from acid solution.

Soluble calcium antimony complex salts can likewise be obtained when different proportions are used in the above example, for instance, 40 gs. of calcium gluconate.

In a similar manner can be produced soluble calcium antimony complex salts, for example, of glucoheptonic acid.

Example 7

A solution of 6 gs. of gluconic acid, 2.7 gs. of crystallized ferric chloride (6H₂O) and 1.7 gs. of anhydrous calcium chloride in 20 ccs. of water is neutralized with 5N-caustic soda. The solution is precipitated by pouring into methylalcohol. After separation and drying the calcium iron-gluconate of the probable formula

$$[Fe_2\{OCH_2.(CHOH)_4.COO\}_6]Ca_3$$

is obtained as a light yellow powder, readily soluble in water with a neutral reaction. Oxalic acid precipitates calcium oxalate from the aqueous solution. In an analogous manner calcium manganese gluconate can be prepared.

Example 8

4.9 gs. of anhydrous calcium glucoheptonate, 1.35 gs. of crystallized ferric chloride and one g. of calcium carbonate are boiled in 20 ccs. of water until the evolution of carbon dioxide has ceased. The solution is filtered and the calcium iron-glucoheptonate of the probable formula

$$[Fe_2\{OCH_2.(CHOH)_5.COO\}_6]Ca_3$$

formed is precipitated by pouring into methylalcohol. After separation and drying the calcium iron-glucoheptonate forms a yellow powder which is readily soluble in water.

Example 9

To a solution of 36 gs. of gluconic acid lactone and 18 gs. of lead acetate in water 2N-milk of lime is added until the mixture remains neutral. After standing for some time the solution is filtered and the calcium lead gluconate formed is precipitated by pouring into methylalcohol. The precipitate is separated and dried. A whitish powder which is readily soluble in water with neutral reaction is obtained. From the solution of the lead complex compound lead sulfide is precipitated by means of hydrogen sulfide, ammonium oxalate precipitates calcium oxalate. The content of lead amounts to about 17 per cent. When other quantities of the components are applied, products with another lead content with analogous properties are obtained.

In an analogous manner a complex compound may be obtained when glucoheptonic acid lactone is used as complex-forming starting component.

Example 10

To a solution of 54 gs. of gluconic acid lactone and 22 gs. of stannous chloride in water 2N-milk of lime is added while heating on the water bath until the reaction of the mixture remains neutral (about 230 ccms.). The mixture is then cooled, filtered, the calcium tin-gluconate formed is precipitated by pouring into methylalcohol, the precipitate is filtered with suction, washed and dried in vacuo. A whitish powder is obtained which is soluble in water with a neutral reaction. The content of tin amounts to about 13 per cent.

The sequence of the addition of the reactants is without any importance, since it is only necessary to react together stannous oxide formed by the reaction of the stannous chloride with the basic calcium compound, gluconic acid formed by the action of water on the corresponding lactone, and the residue of the milk of lime. For instance the solution of the different reactants may be poured together or the mixture of stannous chloride and the milk of lime is added to the gluconic acid lactone or the free acid. The mixture of the gluconic acid lactone and the stannous chloride may also be admixed with the milk of lime, or the milk of lime and the solution of the gluconic acid or its lactone may be poured together whereupon the solution of the stannous chloride is added.

In an analogous manner corresponding complex salts, for example, of tetravalent tin when starting with tetravalent tin compounds or of copper or of titanium with gluconic acid or glucoheptonic acid or lactobionic acid or galactonic acid are obtainable.

This application is a continuation-in-part of our U. S. application Ser. No. 612,638 filed May 20th, 1932, Patent No. 2,097,235.

We claim:

1. The process of preparing neutral complex compounds which comprises reacting a compound selected from the group consisting of aliphatic polyhydroxy monocarboxylic acids containing at least 5 carbon atoms and at least 3 hydroxy groups bound to 3 adjoining carbon atoms lactones thereof and the calcium and strontium salts of said acids with a salt of a base metal other than alkali- and alkaline earth metals, but having an atomic number of at least 22, capable of forming hydroxides under the reaction conditions the acid radicle of said salt being incapable of forming insoluble salts with calcium and strontium in the presence of a basic compound of an alkaline earth metal of the group consisting of calcium and strontium in an amount which is sufficient to form the neutral complex compound.

2. The process of preparing neutral complex compounds which comprises reacting a compound selected from the group consisting of aliphatic polyhydroxy monocarboxylic acids containing at least 5 carbon atoms and at least 3 hydroxy groups bound to 3 adjoining carbon atoms lactones thereof and the calcium and strontium salts of said acids with a salt of a base metal other than alkali- and alkaline earth metals, but having an atomic number of at least 22, capable of forming hydroxides under the reaction conditions the acid radicle of said salt being incapable of forming insoluble salts with calcium and strontium in aqueous solution and adding a basic compound of an alkaline earth metal of the group consisting of calcium and strontium in an amount which is sufficient to form the neutral complex compound.

3. The process of preparing neutral complex compounds which comprises reacting a compound selected from the group consisting of aliphatic polyhydroxy monocarboxylic acids containing from five to seven carbon atoms and at least 3 hydroxy groups bound to 3 adjoining carbon atoms lactones thereof and the calcium and strontium salts of said acids with a salt of a base metal other than alkali- and alkaline earth metals, but having an atomic number of at least 22, capable of forming hydroxides under the reaction conditions the acid radicle of said salt being incapable of forming insoluble salts with calcium and strontium in the presence of a basic compound of an alkaline earth metal of the group consisting of calcium and strontium in an amount which is sufficient to form the neutral complex compound.

4. The process of preparing neutral complex compounds which comprises reacting a compound selected from the group consisting of aliphatic polyhydroxy monocarboxylic acids containing at least 5 carbon atoms and at least 3 hydroxy groups bound to 3 adjoining carbon atoms lactones thereof and the calcium and strontium salts of said acids with a salt of a base metal other than alkali- and alkaline earth metals, but having an atomic number of at least 22, capable of forming hydroxides under the reaction conditions the acid radicle of said salt being incapable of forming insoluble salts with calcium and strontium in aqueous solution and adding calcium hydroxide in an amount which is sufficient to form the neutral complex compound.

5. The process of preparing neutral complex compounds which comprises reacting a compound selected from the group consisting of aliphatic polyhydroxy monocarboxylic acids containing from five to seven carbon atoms and at least 3 hydroxy groups bound to 3 adjoining carbon atoms lactones thereof and the calcium and strontium salts of said acids with a salt of a base metal other than alkali- and alkaline earth metals, but having an atomic number of at least 22, capable of forming hydroxides under the reaction conditions the said radicle of said salt being incapable of forming insoluble salts with calcium and strontium in aqueous solution and adding calcium hydroxide in an amount which is sufficient to form the neutral complex compound.

6. The process of preparing neutral complex compounds which comprises reacting in an aqueous solution a compound selected from the group consisting of aliphatic polyhydroxy monocarboxylic acids containing from five to seven carbon atoms and at least 3 hydroxy groups bound to 3 adjoining carbon atoms lactones thereof and the calcium and strontium salts of said acids with a lead salt capable of forming hydroxides under the reaction conditions, the acid radicle of said lead salt being incapable of forming insoluble salts with calcium and strontium and adding calcium hydroxide in an amount which is sufficient to form the neutral complex compound.

7. The process of preparing neutral complex compounds which comprises reacting an aliphatic polyhydroxy monocarboxylic acid containing at least 5 carbon atoms and at least 3 hydroxy groups bound to 3 adjoining carbon atoms with a metal salt of a base other than alkali- and alkaline earth metals, but having an atomic number of at least 22, capable of forming hydroxides under the reaction conditions the acid radicle of said salt being incapable of forming insoluble salts with calcium and strontium in the presence of a basic compound of an alkaline earth metal of the group consisting of calcium and strontium in an amount which is sufficient to form the neutral complex compound.

8. The process which comprises reacting upon gluconic acid in the form of its lactone with lead acetate and adding calcium hydroxide in an amount sufficient to form the neutral complex compound.

9. The process which comprises reacting upon 36 parts by weight of gluconic acid in the form of its lactone with 18 parts by weight of lead acetate in aqueous solution and adding calcium hydroxide in an amount sufficient to form the neutral complex compound.

10. The process which comprises reacting about 60 parts by weight of calcium gluconate with about 11.5 parts by weight of antimony trichloride in the presence of water and adding calcium hydroxide in an amount sufficient to form the neutral complex compound.

11. The process which comprises reacting upon 8.6 parts by weight of calcium gluconate with 2.7 parts by weight of ferric chloride in an aqueous solution and heating with calcium carbonate in an amount sufficient to form the neutral complex compound.

12. Neutral complex compounds of lead with an aliphatic polyhydroxy monocarboxylic acid of 5 to 7 carbon atoms and containing at least 3 hydroxy groups bound to three adjacent carbon atoms, said complex compounds being neutral by the content of calcium being whitish powders, soluble in water with about neutral reaction.

13. Neutral calcium lead-gluconate, being a white powder, containing about 17% of lead, being soluble in water with about neutral reaction.

HANS SCHMIDT.
HEINRICH JUNG.